United States Patent
Blevis et al.

(10) Patent No.: US 7,242,002 B2
(45) Date of Patent: Jul. 10, 2007

(54) COMPACT GAMMA CAMERA

(75) Inventors: Ira M. Blevis, Zichron-Yaakov (IL); Raed T. Khamaisi, Kfar-Kana (IL)

(73) Assignee: General Electric Medical Systems Israel Ltd., Tirat HaCarmel (IL)

( * ) Notice: Subject to any disclaimer, the term of this patent is extended or adjusted under 35 U.S.C. 154(b) by 141 days.

(21) Appl. No.: 10/802,404

(22) Filed: Mar. 16, 2004

(65) Prior Publication Data
US 2005/0205795 A1    Sep. 22, 2005

(51) Int. Cl.
G01T 1/166    (2006.01)

(52) U.S. Cl. .............................. 250/363.05; 250/363.04

(58) Field of Classification Search ............ 250/363.05, 250/370.09, 363.02, 363.03, 363.04, 363.08; 600/431; 378/22, 189
See application file for complete search history.

(56) References Cited

U.S. PATENT DOCUMENTS

| | | | |
|---|---|---|---|
| 4,649,277 A | | 3/1987 | Terra et al. |
| 5,587,585 A | * | 12/1996 | Eisen et al. ............ 250/370.09 |
| 5,594,251 A | | 1/1997 | Fleury et al. |
| 5,752,916 A | * | 5/1998 | Guerard et al. ......... 250/363.04 |
| 5,762,608 A | * | 6/1998 | Warne et al. ................ 600/425 |
| 5,811,813 A | | 9/1998 | Maor |
| 6,055,450 A | * | 4/2000 | Ashburn ....................... 600/431 |
| 6,147,353 A | * | 11/2000 | Gagnon et al. ......... 250/363.05 |
| 6,180,943 B1 | * | 1/2001 | Lange .................... 250/363.05 |
| 6,242,745 B1 | | 6/2001 | Berlad et al. |
| 6,444,987 B1 | | 9/2002 | Treillet et al. |
| 6,582,121 B2 | * | 6/2003 | Crain et al. .................. 378/197 |
| 6,621,084 B1 | | 9/2003 | Wainer et al. |
| 6,927,395 B2 | * | 8/2005 | Koops et al. .......... 250/363.08 |
| 2005/0189494 A1 | * | 9/2005 | Conwell ................ 250/363.04 |

FOREIGN PATENT DOCUMENTS

WO    WO 98/27443    6/1998

* cited by examiner

Primary Examiner—David Porta
Assistant Examiner—Frederick F. Rosenberger

(57) ABSTRACT

A gamma camera system including a pair of gamma camera heads connected to form substantially a right angle. The pair of gamma camera heads are mounted on an arm. A rotation mechanism includes a pivot mounted on the arm and allows for rotation of pair of gamma camera heads with respect to the arm about a line parallel to the connection of the gamma camera heads.

28 Claims, 7 Drawing Sheets

COMPACT GAMMA CAMERA

FIELD OF THE INVENTION

The present invention relates to gamma camera systems, and more particularly to a gamma camera with a dual detector camera head.

BACKGROUND OF THE INVENTION

Gamma camera systems are used in nuclear medicine to produce an image based on the internal physiology of a patient. In the process of examination, a radio-pharmaceutical is introduced into the patient. The substance migrates to certain organs of the patients body. Measuring radiation emitted from the patient can be used to image the distribution of the radio-pharmaceutical in the patient. PCT Publication WO 98/27443, the disclosure of which is incorporated herein by reference, describes a light weight gamma camera and details relating to performing such measurements.

In order to supply a tomographic image of a patient, it is common practice to measure the radiation with a machine controlled gamma camera performing a contour trajectory of the patient. Such a process requires moving the gamma camera with precise positioning around the patient in order to construct an accurate tomographic image. U.S. Pat. No. 4,649,277 to Terra et al., the disclosure of which is incorporated herein by reference, describes a gamma camera mounted on a gantry supported by a column running on guides. By positioning the patient in a selected position and rotating the gamma camera around the axis of the patient, a tomographic image is formed.

In order to improve sensitivity and speed up the process of forming a tomographic image it has been suggested using two cameras rotating about the axis of the patient. U.S. Pat. No. 5,594,251 to Fleury et al., the disclosure of which is incorporated herein by reference, describes a system with a fixed base and two gamma cameras rotating about a barycentric axis.

In U.S. Pat. No. 5,811,813 to Maor, the disclosure of which is incorporated herein by reference, there is described a gamma camera head with two detectors forming an angle between them. A dual detector gamma camera head allows quicker and more accurate measurements by sensing radiation at two angles at the same time. This is useful for spot measurements using a non moving camera. Additionally, in tomographic images a dual detector head enables measuring a larger arc with less rotation, for example a 180° arc with a 90° rotation.

SUMMARY OF THE INVENTION

An aspect of some embodiments of the invention relates to a gamma camera system with a dual headed gamma camera mounted on an arm and including a rotation mechanism comprising a pivot mounted on the arm, allowing for rotation of the gamma camera heads with respect to the arm about a line parallel to the connection.

In an exemplary embodiment of the invention, the gamma camera uses linear motion in conjunction with rotation of the gamma camera heads around an axis other than the patient axis to provide multiple views of the patient. Using linear motion to acquire the image optionally reduces the footprint of the system compared to a system that surrounds the patient.

In some embodiments of the invention, the detection path of the camera is selected by the gamma camera system before beginning the scan. Alternatively or additionally, the detection path varies based on the contour of the patient as detected while scanning.

An aspect of some embodiments of the invention relates to a gamma camera system having two gamma camera heads joined at substantially a right angle, and adapted to provide linear motion of the heads in a plane containing the right angle.

An aspect of some embodiments of the invention relates to a gamma camera system for reconstructing the distribution of gamma sources in a three dimensional volume having an axis corresponding to an axis about which views of the volume are taken by one or more gamma camera heads of the volume, the system including at least one head having a dimension smaller than a largest dimension of the reconstruction volume perpendicular to the axis.

In some embodiments of the invention, various patient positions can be used, for example lying down, standing up or sitting.

There is thus provided according to an exemplary embodiment of the invention, a gamma camera system comprising:

a pair of gamma camera heads connected to form substantially a right angle;

an arm on which the pair of cameras heads are mounted; and a rotation mechanism comprising a pivot mounted on the arm, allowing for rotation of the gamma camera heads with respect to the arm about a line parallel to the connection.

In an embodiment of the invention, the gamma camera system is adapted to allow linear movement of the gamma camera heads in at least one direction perpendicular to the line. Optionally, the linear motion is provided without moving a base on which the gamma camera system is mounted.

In an embodiment of the invention, the gamma camera system is adapted to allow linear motion of the gamma camera heads in all directions perpendicular to the line.

In an embodiment of the invention, the gamma camera system is adapted to perform at least a partial rotation of the gamma camera heads about an object within a quadrant formed by the heads, by combination of linear motion and rotation about the pivot. In various embodiments of the invention, the partial rotation is at least 90° or at least 180°.

In an embodiment of the invention, the arm is adapted to rotate the camera heads such that the line is rotatable about an axis perpendicular to the line.

Optionally, the arm comprises between 2 to 6 extensions, which extend telescopically.

Optionally, the gamma camera heads comprise sensors that sense obstacles in a path followed by the camera, in order to prevent the camera from colliding with a scanned object.

Optionally, the camera automatically follows a path which is a contour of a scanned object. Optionally, the camera follows a preselected path. Optionally, the heads follows a path that is chosen during motion of the heads about the object. Optionally, the gamma camera system is adapted to scan a prone patient. Alternatively or additionally, it is adapted to scan a standing patient. Alternatively or additionally, it is adapted to scan a seated patient.

In an embodiment of the invention, the gamma camera is adapted to acquire radiation data from all directions of a scanned object. Alternatively or additionally, the gamma camera is adapted to acquire data from 180° about the scanned object.

Optionally, the gamma camera is adapted to perform a scan of the entire length of a patient, without moving the patient.

Optionally the gamma camera includes a controller adapted to reconstruct images within a reconstruction circle and wherein the dimension of each of the gamma camera heads in a plane perpendicular to the line is at least as large as the diameter of the circle.

In an embodiment of the invention, the gamma camera is operative to reconstruct images within a reconstruction circle and wherein the dimension of each of the gamma camera heads in a plane perpendicular to the line is at least as large as the radius of the circle, but smaller than the diameter of the circle. Optionally, the dimension is less than 1.5 times the radius.

Optionally, the heads are rigidly connected at the angle.

There is further provided, in accordance with an embodiment of the invention, a gamma camera system comprising:

a pair of gamma camera heads connected to form substantially a right angle; and an arm on which the pair of cameras heads are mounted; wherein the arm is adapted to allow for linear motion of the pair of camera heads in a plane containing the right angle.

Optionally, the arm is adapted to move in the plane without moving a base on which the camera system is mounted.

Optionally, the arm is adapted to allow for linear motion in all directions within the plane of the right angle.

Optionally, the gamma camera includes a controller operative to reconstruct images within a reconstruction circle and wherein the amount of the linear motion is at least as large as a diameter of the circle.

Optionally, the heads are rigidly connected at the angle.

There is further provided, in accordance with an embodiment of the invention, a gamma camera system comprising:

a pair of gamma camera heads connected to form an angle and adapted to view a reconstruction volume from a plurality of directions having an axis perpendicular to a plane containing the right angle; and a controller adapted to reconstruct a three dimensional image of radiation sources in the reconstruction volume from data acquired by the camera heads as they rotate about the axis, wherein each of the pair of gamma camera heads has a dimension in the plane containing the angle smaller than a largest dimension of the reconstruction volume perpendicular to the axis.

In an embodiment of the invention, the angle is substantially equal to a right angle.

In an embodiment of the invention, each of the gamma camera heads has a dimension of between 50% and 75% of the largest dimension.

Optionally, the heads are rigidly connected at the angle.

BRIEF DESCRIPTION OF FIGURES

Particular exemplary embodiments of the invention will be described with reference to the following description of embodiments in conjunction with the figures, wherein identical structures, elements or parts which appear in more than one figure are generally labeled with a same or similar number in all the figures in which they appear, in which.

DETAILED DESCRIPTION OF EMBODIMENTS

Figure 1:
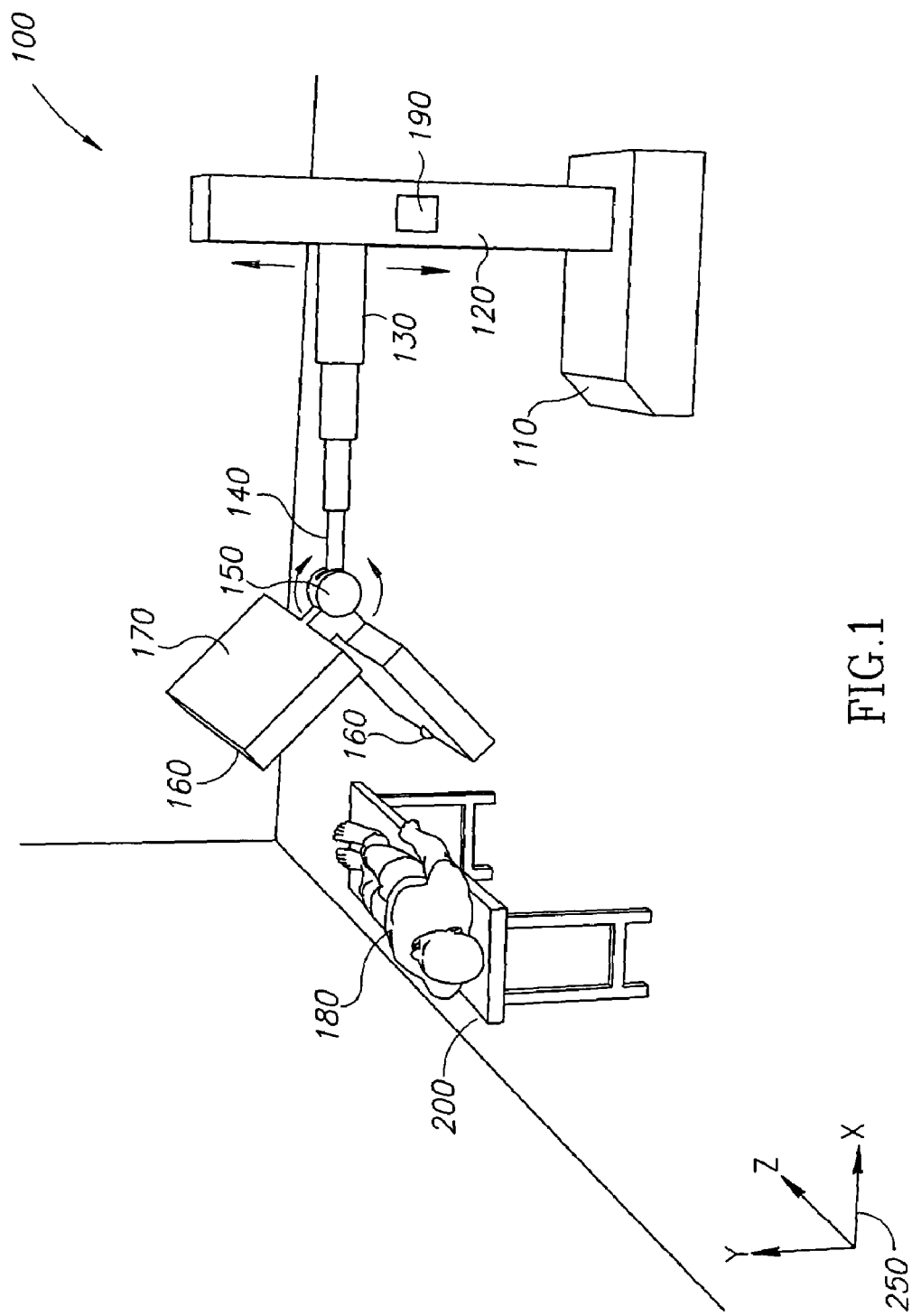
FIG. 1 is a schematic illustration of a gamma camera system according to an exemplary embodiment of the invention.

FIG. 1 is a schematic illustration of a gamma camera system 100 according to an exemplary embodiment of the invention. System 100 comprises an L shaped dual gamma camera head 170 and support apparatus to support head 170 and control its position in space. Cartesian coordinate system 250 will be used to describe the directions of motion by the support apparatus supporting head 170. In this coordinate system, the z-axis is the axis of a prone patient, and is parallel to the floor.

As shown in FIG. 1, the support apparatus for head 170 is mounted on an extendible support arm 140. Extendible support arm 140, optionally comprises between 2 to 6 parts which expand telescopically to allow extension of the support arm to a larger distance than the size of an arm base 130 which houses the expandable parts. Arm base 130 optionally allows vertical motion along a column 120. Column 120 is held up by a heavy base 110 (for example filled with lead), which keeps system 100 from falling over due to the moment of the head. Alternatively or additionally base 110 is fastened to the floor. In some embodiments of the invention, base 110 is connected to a stabilization base (not shown) on the exterior side of the floor, for example on the ceiling of the floor below, to support stabilizing column 120.

In an exemplary embodiment of the invention, system 100 can be used in rooms with limited space, since it is based on a small footprint and does not need to move around or form a large trajectory for head 170, as in other systems described above in the incorporated references.

In an exemplary embodiment of the invention, head 170 is connected to extendible support arm 140 with a rotatable joint 150, permitting rotation of head 170 in the XY plane of coordinate system 250. It is noted that while head 170 rotates in the XY plane, as do heads in prior art gamma cameras, its axis of rotation is not centered in the patient or even in a tomographic reconstruction region. Rather, extendible support arm 140 contributes translational motion along the X axis and arm base 130 optionally contributes translational motion along the Y axis of coordinate system 250.

In the embodiment shown, the pivot is at the end of the line joining the heads. This allows for 360° rotation of the heads about the pivot axis. Alternatively, the pivot can be placed at the center of the line joining the heads. This would restrict the rotation of the heads to somewhat less than 360°. As can be readily understood from the following explanation, in general 360° rotation is not generally required. Central location of pivot results in a more stable structure.

In an exemplary embodiment of the invention, the movement of the parts of the gamma camera support system are controlled by a standard hydraulic and/or electronic system. Optionally, a computerized control 190 controls the movement and positioning of head 170. In some embodiments of the invention, a remote control is used, so an operator can control the system from a distance, for example from across the room.

In some embodiments of the invention, head 170 is equipped with sensors 160 that sense objects in the proximity of head 170, in order to guide its motion when examining a patient, for example to accurately traverse the contour of the patient without hitting the patient. Such sensors, in various positions notify a motion control to alter movement of the head or pause its movement to overcome obstacles.

In an exemplary embodiment of the invention, a patient 180 is positioned on an examination bed 200 in order to be examined by system 100. In some embodiments of the invention examination bed 200 is accessible from underneath. As a result head 170 can pass under the examination bed in order to acquire radiation events from patient 180, from all directions (or at least 180°). In an exemplary embodiment of the invention, examination bed 200 is positioned according to the part of patient 180 that needs to be examined, for example heart, head or feet. Optionally, the distance along the X coordinate for placing examination bed 200 from gamma camera system 100 can vary and is limited by the maximal extent of extendible support arm 140.

Figure 2A:
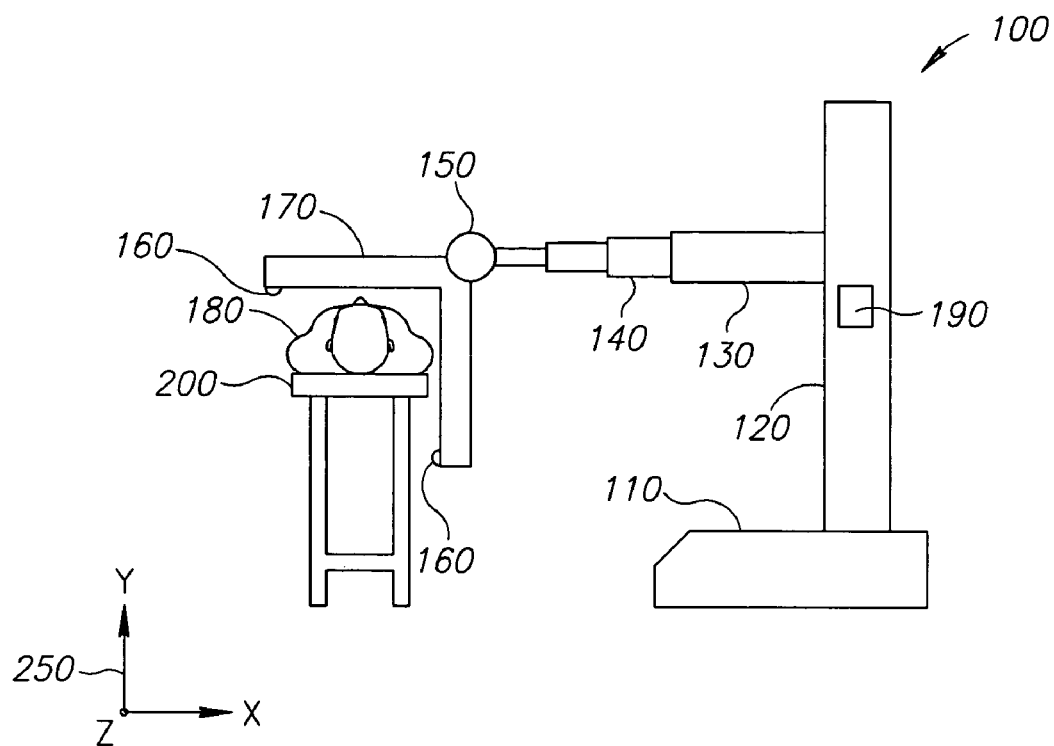
FIGS. 2A, 2B, 2C, 2D, 2E and 2F are schematic illustrations of a gamma camera system, in various positions of use, according to an exemplary embodiment of the invention.
Figure 2B:
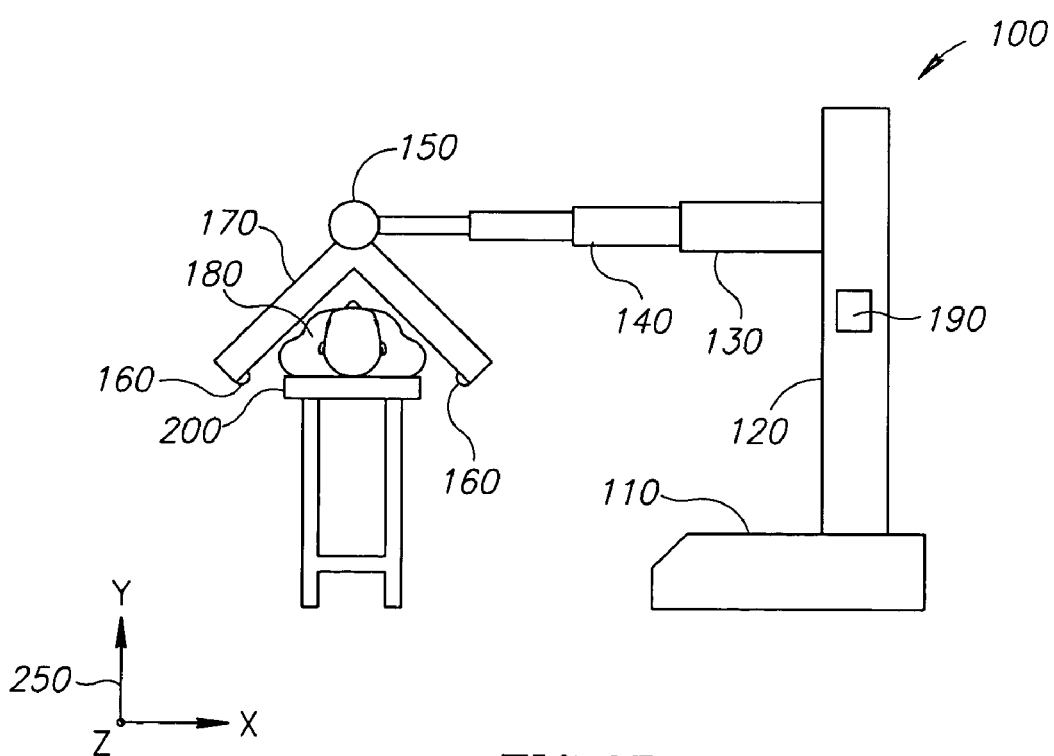

FIGS. 2A, 2B, 2C, 2D, 2E and 2F are schematic illustrations of gamma camera system 100, in various positions of use, according to an exemplary embodiment of the invention. In an exemplary embodiment of the invention, patient 180 is placed on examination bed 200 beside gamma camera system 100. Optionally as shown in FIG. 2A, the detectors of head 170 are positioned close to patient 180, wherein one detector detects events from a side of the patient and the other detector detects events from the front (as shown) or back of patient 180. Optionally, extendible support arm 140 begins to extend outward in order for the detectors of head 170 to orbit around the upper half of patient 180. In some embodiments of the invention, sensors 160 notify control 190 of gamma camera system 100 of the distance from the patient, so that gamma camera system 100 can instruct arm base 130 to rise, and instruct joint 150 to rotate head 170 in the XY plane, to reach the position shown in FIG. 2B, without colliding with patient 180. Alternatively or additionally, a system operator selects a trajectory fitting patient 180, and positions patient 180 accordingly. In some embodiments of the invention, the trajectory of head 170 is controlled by the system operator during the examination.

Figure 2C:
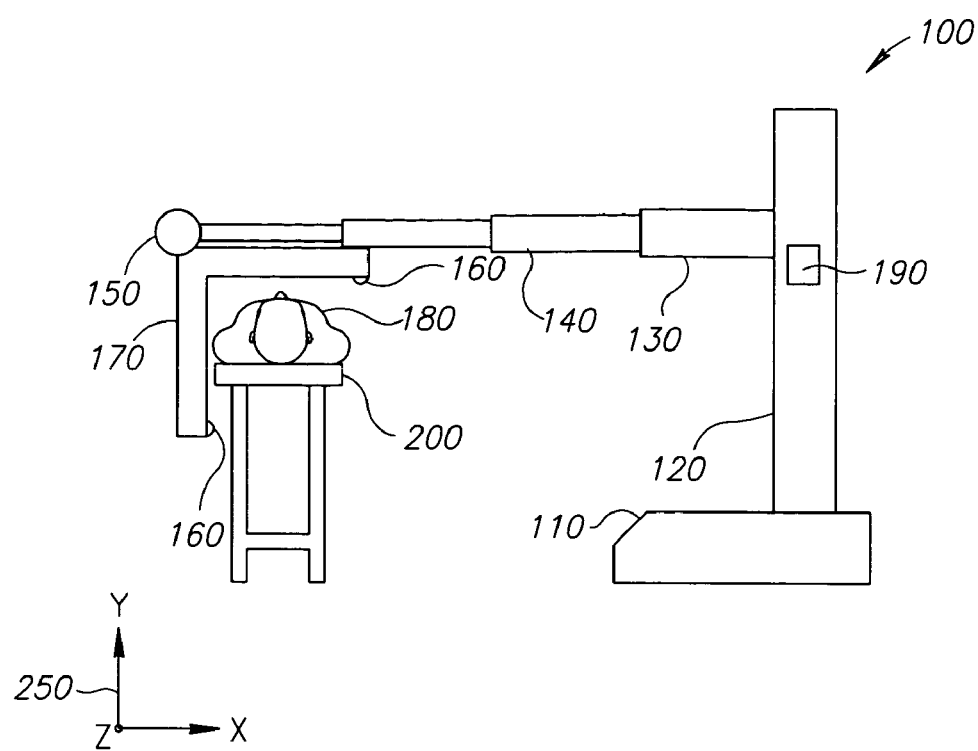

In an exemplary embodiment of the invention, as shown in FIG. 2C, head 170 completes a scan of 180° when head 170 is positioned to measure the opposite upper side of patient 180.

It is noted that vertical movement of the camera heads is not necessary for this embodiment of the invention.

Figure 2D:
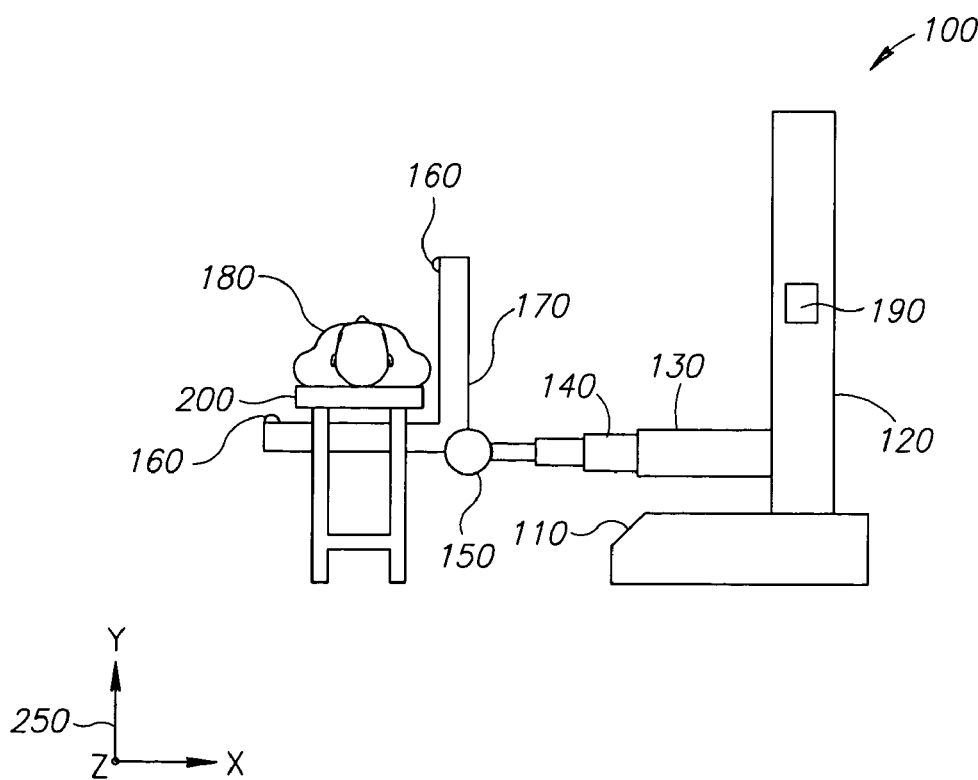
Figure 2E:
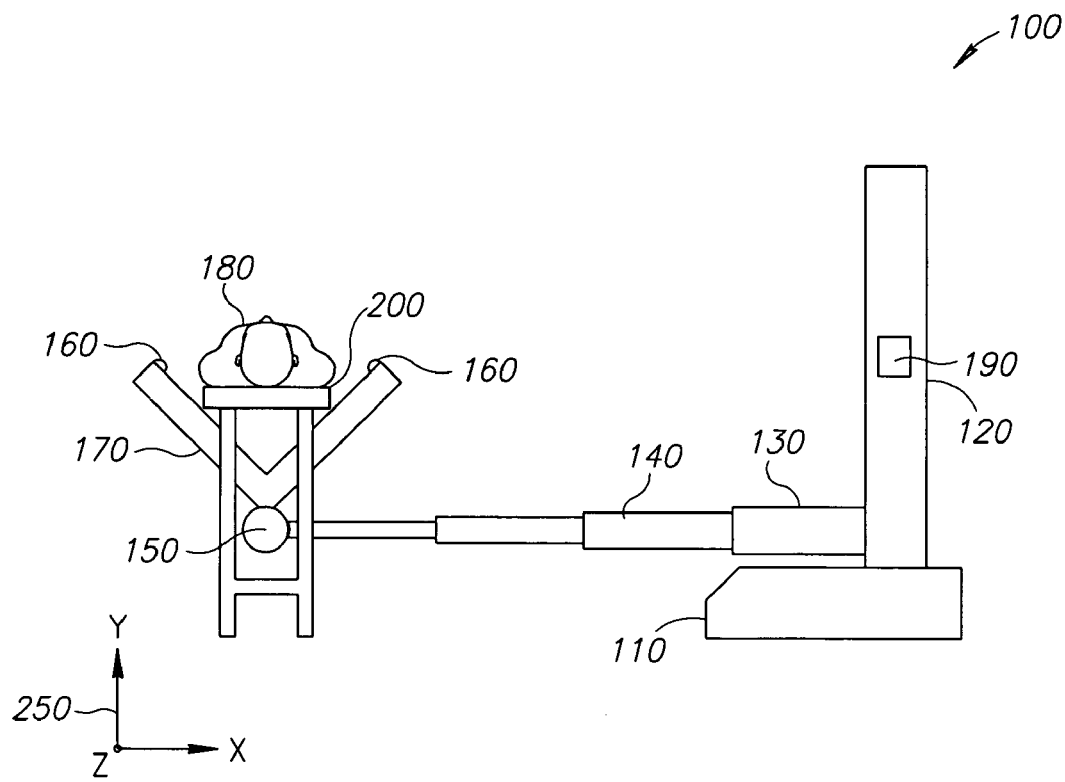
Figure 2F:
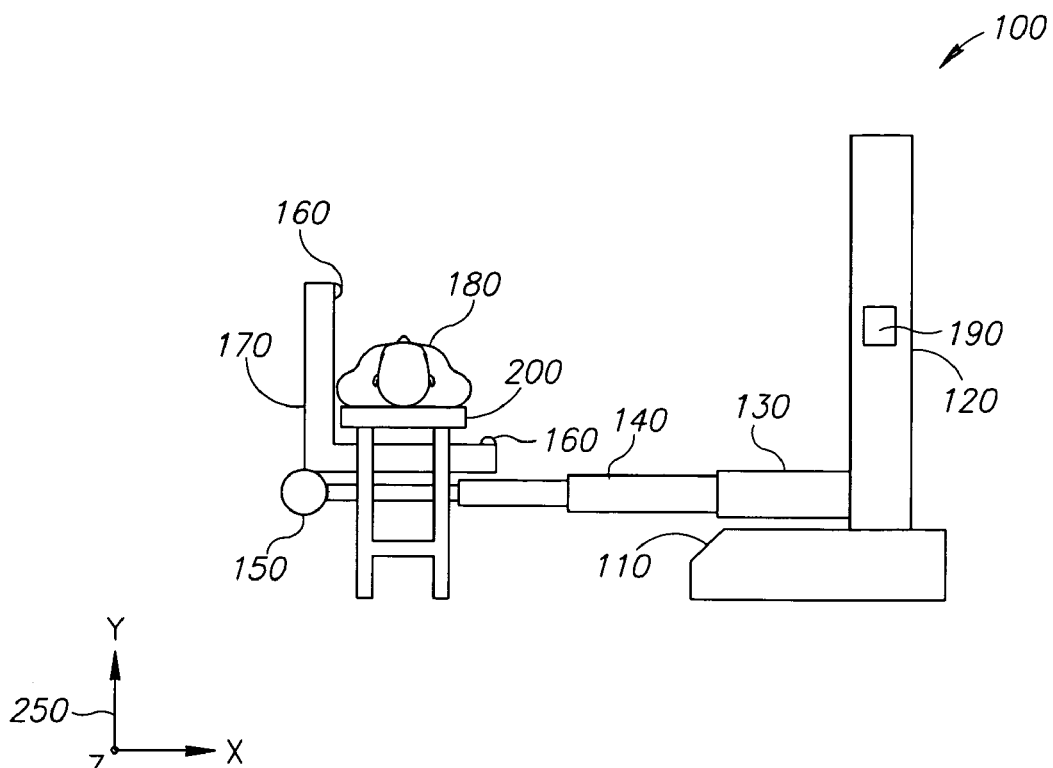

Optionally, after scanning 180°, extendible support arm 140 retracts to its original non-extended position. Arm base 130 is lowered so that head 170 can pass under patient 180 in order to complete a full trajectory of 360° around patient 180. FIGS. 2D, 2E and 2F show head 170 under examination bed 200, in order to complete the trajectory. It should be noted that FIGS. 2A, 2B, 2C, 2D, 2E and 2F represent intermediate positions of the full trajectory around patient 180.

In some embodiments of the invention, examination bed 200 comprises a thin bed of a material that does not interfere with the radiation. Alternatively, the actual detection is limited to less than 360° from the areas not interfered by examination bed 200, for example 210°. Further alternatively, detection is performed only at 180°.

FIGS. 3A, 3B, 3C, 3D and 3E are schematic illustrations of gamma camera system 100, in various positions of use, according to an exemplary embodiment of the invention.

In some embodiments of the invention, joint 150 or extendible support arm 140 or base 130 allow rotation of head 170 in the YZ plane of coordinate system 250 (for example by rotating arm 140 around its axis) to support measuring patient 180 in various postures.

Figure 3A:
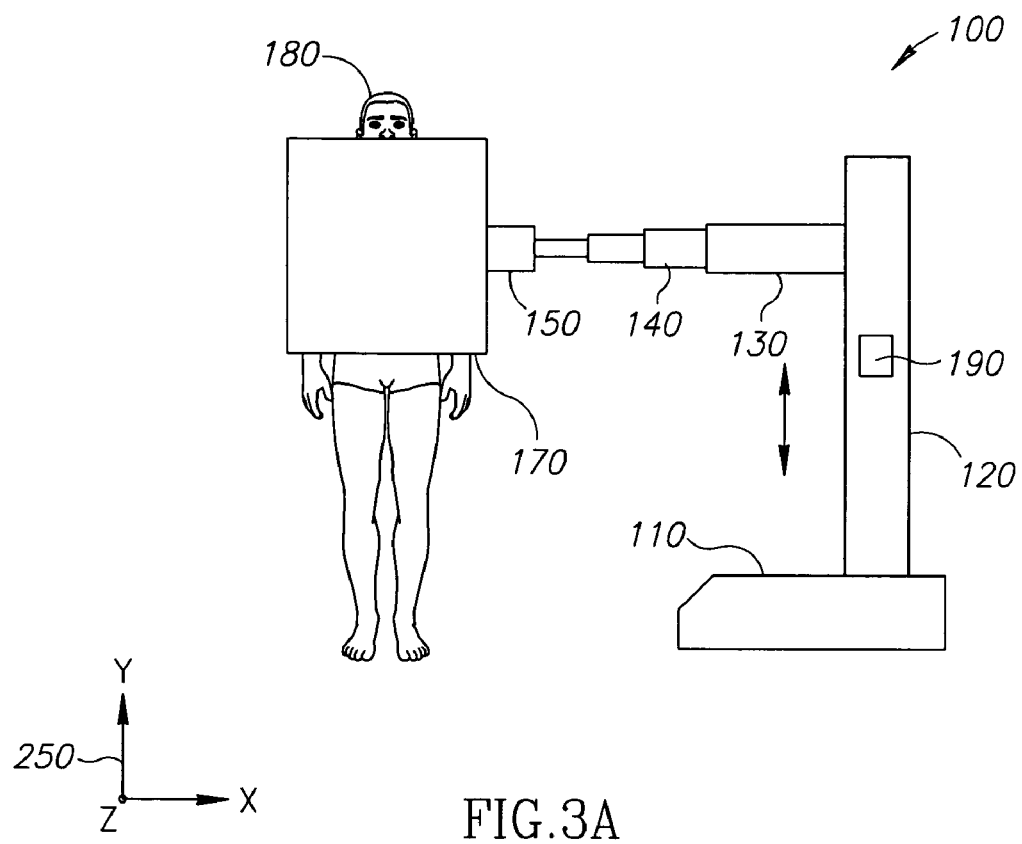
FIGS. 3A, 3B, 3C, 3D and 3E are schematic illustrations of a gamma camera system, in various positions of use, according to an exemplary embodiment of the invention.
Figure 3B:
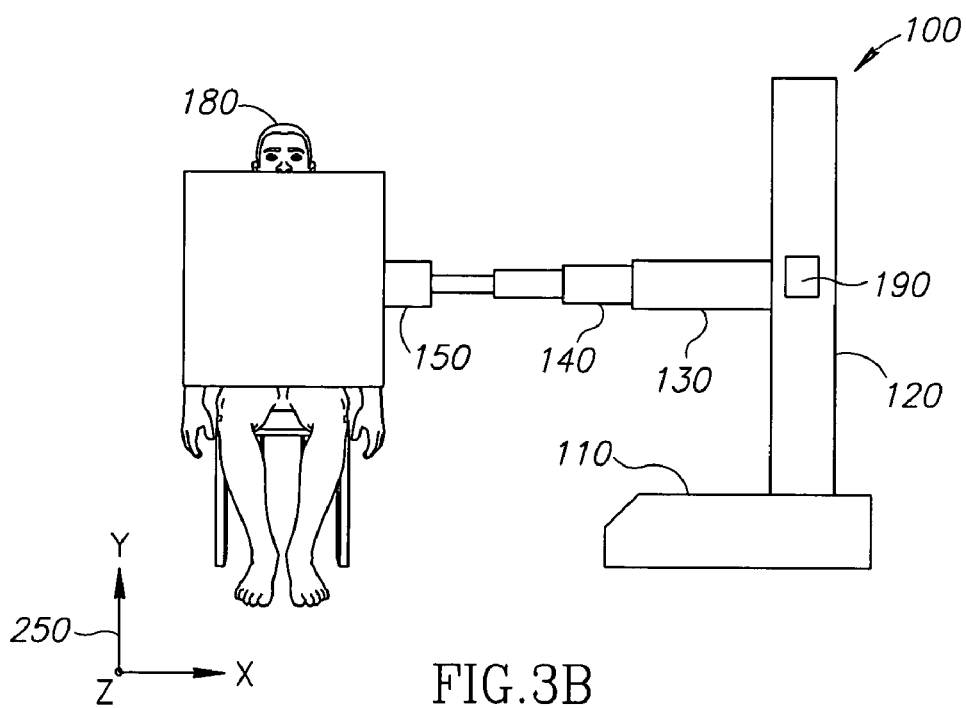

In an exemplary embodiment of the invention, as illustrated in FIG. 3A, patient 180 is positioned standing in front of system 100, at a distance that is reachable by extendible support arm 140. Alternatively as illustrated in FIG. 3B patient 180 is seated in front of system 100.

Figure 3C:
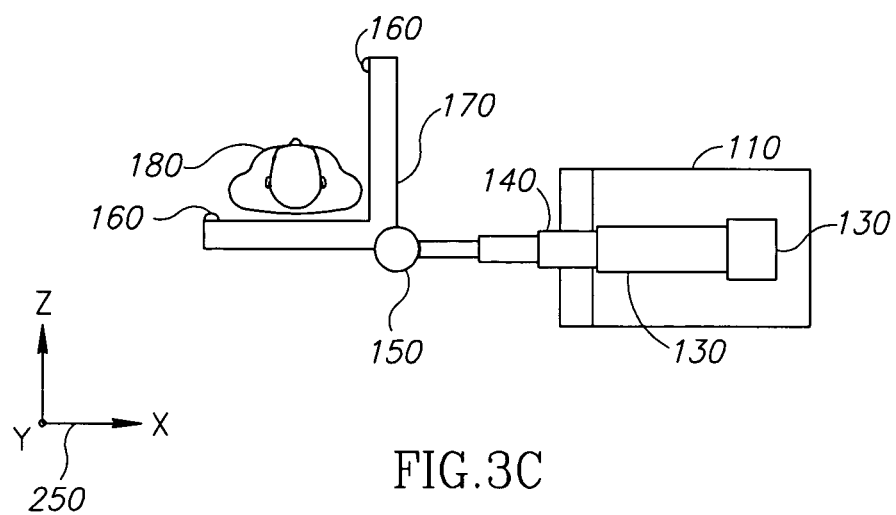
Figure 3D:
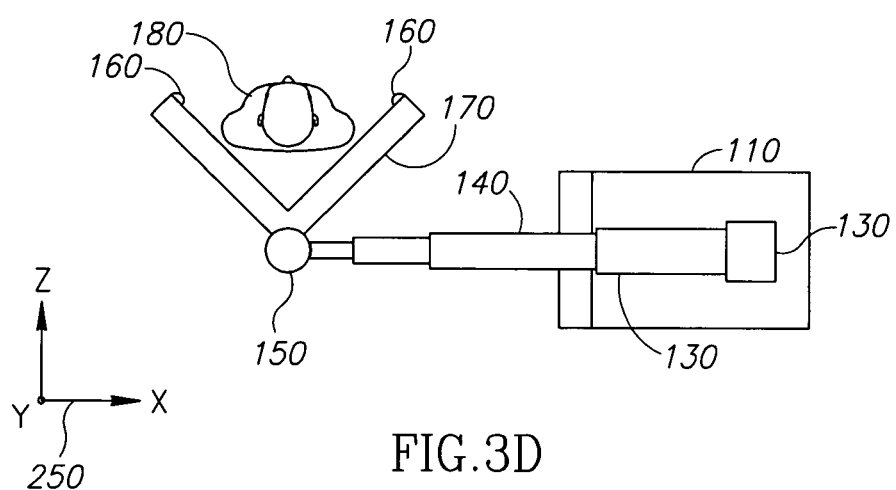
Figure 3E:
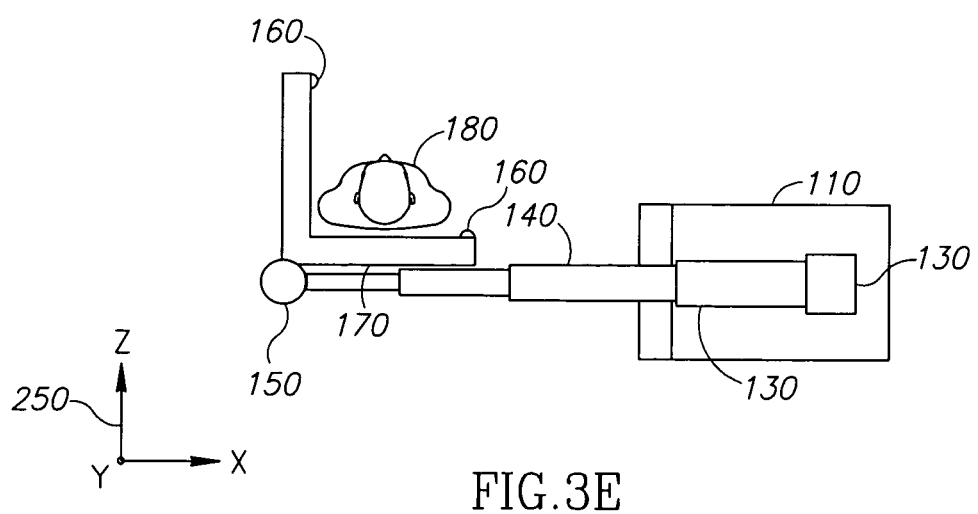

Head 170 is rotated 90° in plane YZ in order to be positioned as shown from above in FIG. 3C. In an exemplary embodiment of the invention, FIGS. 3C, 3D and 3E, illustrate measuring a 180° contour of patient 180 while rotating head 170 in the XZ plane by 90°.

In an exemplary embodiment of the invention, as shown in FIG. 3C, head 170 is positioned to encompass a first side of patient 180, that is, it receives radiation from both the entire front and entire side of the patient. Extendible support arm 140 expands outward while rotating head 170 around joint 150 in the XZ plane to receive radiation from the back of patient 180 as shown in FIG. 3D. Extendible support arm 140 continues to expand, while the head rotates about pivot 150, until head 170 reaches the opposite side as shown in FIG. 3E. Alternatively, the scan is carried out over the front and sides of the patient. Optionally, the scan is carried out over 360°, as described above with respect to FIG. 2.

In some embodiments of the invention, gamma camera system 100 can be used to scan the length of patient 180 (for example positioned as in FIG. 3A) by moving arm base 130 up and down along the Y axis of coordinate system 250.

While the gamma camera heads are each shown to be as large, in a direction perpendicular to the axis of rotation of the heads, as the maximum extent of the patient, this is not absolutely necessary. In fact, even if the heads are only half this extent, it may possible to acquire radiation from all directions. For example, if the head is half the width of the patient (usually the larger dimension of the patient and defining a minimum reconstruction diameter), anterior posterior radiation from the left side of the patient can be acquired when the camera heads are in the position shown in FIG. 2F and anterior posterior radiation from the right side of the patient can be acquired when the camera heads are in the position shown in FIG. 2D. Similar acquisition would apply for other radiation directions. While this would require more than 90 degrees of rotation of the heads, it appears that in most cases 270 degrees would be sufficient, since at least one of the detectors of head 170 is positioned to scan each of four sides of the patient. While half the diameter of the reconstruction circle is necessary, somewhat larger dimensions may be used, such as 60% or up to 75% of the diameter of the reconstruction circle, in order to ease positioning and to allow for obese patients.

While this requires a larger angle of scanning, the weight of the heads can be reduced by up to 50%, making the structure both less expensive to produce and more stable.

In some embodiments of the invention, software is used to analyze the scan results in order to overcome double coverage of areas on the patient and connect scan results of continuous areas which are scanned non-continuously. In an exemplary embodiment of the invention, software eliminates double measurements for example as formed from the scanning under the patient in FIGS. 2D and 2F. Alternatively or additionally, scan results from overlapping areas are averaged out. Further alternatively or additionally, different weights are given to different scan areas, in order to give preference to scan positions which for example, are known to give better results.

In some embodiments of the invention, lighter weight solid state detectors can be used, for example as described in U.S. Pat. No. 6,242,745, and/or U.S. Pat. No. 6,621,084 the disclosures of which are incorporated by reference, as well as other solid state detectors as known in the art, in order to enhance compactness and mobility of system 100. In some embodiments system 100 is limited to scanning low energy isotopes, for example as used in cardiology, bones and other diagnostics in order to allow using heads 170 with less lead shielding and smaller bulk.

In an exemplary embodiment of the invention, the detectors of camera head 170 may be positioned before scanning, at an angle other than 90°, for example at 80° or at 100° in order to enhance scan results. Optionally, system 100 can automatically control the angle in order to avoid obstacles and enhance scan results during scanning.

Figure 4A:
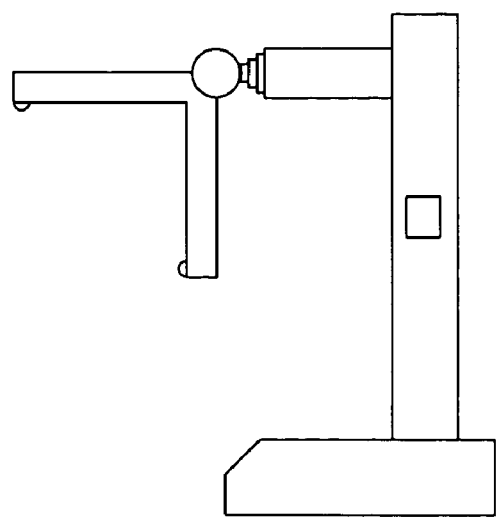
FIGS. 4A, 4B and 4C are schematic illustrations of a gamma camera system, in parking positions, according to an exemplary embodiment of the invention.
Figure 4B:
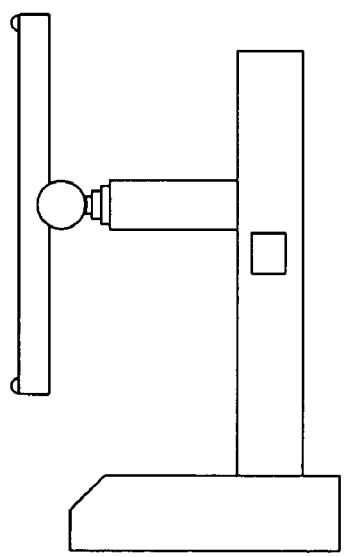
Figure 4C:
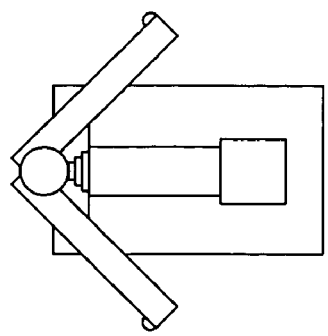

In some embodiments of the invention, when system 100 is not in use the detectors of camera head 170 can be positioned at an angle other than 90° in order to allow a more compact parking position. FIGS. 4A, 4B and 4C are schematic illustrations of a gamma camera system, in various parking positions, according to an exemplary embodiment of the invention.

In FIG. 4A system 100 is shown in a parked position with the detectors of camera head 170 at 90°. Optionally, one detector of camera head 170 can be repositioned to form a 180° angle with the other detector, for example as shown in FIG. 4B, in order for system 100 to form a smaller footprint when not in use. Alternatively, the detectors of head 170 can be rotated and folded back toward column 120 as shown in FIG. 4C in order to minimize the footprint of the system.

It will be appreciated that the above described methods may be varied in many ways, including, changing the type of gamma camera used and/or materials used in the system. It should also be appreciated that the above described description of methods and apparatus are to be interpreted as including apparatus for carrying out the methods and methods of using the apparatus.

The present invention has been described using non-limiting detailed descriptions of embodiments thereof that are provided by way of example and are not intended to limit the scope of the invention. It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art.

It is noted that some of the above described embodiments may describe the best mode contemplated by the inventors and therefore may include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims. When used in the following claims, the terms "comprise", "include", "have" and their conjugates mean "including but not limited to".

The invention claimed is:

1. A gamma camera system comprising:
a pair of gamma camera heads connected to form substantially a right angle;
an arm on which the pair of camera heads are mounted; and
a rotation mechanism comprising a pivot mounted on the arm, allowing for rotation of the gamma camera heads with respect to the arm about a line parallel to the connection of the gamma camera heads.

2. A gamma camera system according to claim 1, wherein the gamma camera system is adapted to allow linear movement of the gamma camera heads in at least one direction perpendicular to the line.

3. A gamma camera according to claim 2 wherein the linear motion is provided without moving a base on which the gamma camera system is mounted.

4. A gamma camera system according to claim 1, wherein the gamma camera system is adapted to allow linear motion of the gamma camera heads in all directions perpendicular to the line.

5. A gamma camera system according to claim 1, wherein the gamma camera system is adapted to perform at least a partial rotation of the gamma camera heads about an object within a quadrant formed by the heads, by combination of linear motion and rotation about the pivot.

6. A gamma camera system according to claim 5, wherein the partial rotation is at least 90°.

7. A gamma camera system according to claim 5, wherein the partial rotation is at least 180°.

8. A gamma camera system according to claim 1, wherein the arm is adapted to rotate the camera heads such that the line is rotatable about an axis perpendicular to the line.

9. A gamma camera system according to claim 1, wherein the arm comprises between 2 to 6 extensions, which extend telescopically.

10. A gamma camera system according to claim 1, wherein the gamma camera heads comprise sensors that sense obstacles in a path followed by the camera, in order to prevent the camera from colliding with a scanned object.

11. A gamma camera system according to claim 1, wherein the camera automatically follows a path which is a contour of a scanned object.

12. A gamma camera system according to claim 1, wherein the camera follows a preselected path.

13. A gamma camera system according to claim 1, wherein the camera follows a path that is chosen during motion of the heads about the object.

14. A gamma camera system according to claim 1, adapted to scan a prone patient.

15. A gamma camera system according to claim 14, adapted to scan a standing patient.

16. A gamma camera system according to claim 14, adapted to scan a seated patient.

17. A gamma camera system according to claim 1, wherein the gamma camera is adapted to acquire radiation data from all directions of a scanned object.

18. A gamma camera system according to claim 1, wherein the gamma camera is adapted to acquire data from 180° about the scanned object.

19. A gamma camera system according to claim 1, wherein the gamma camera is adapted to perform a scan of the entire length of a patient, without moving the patient.

20. A gamma camera system according to claim 1 and including a controller adapted to reconstruct images within a reconstruction circle and wherein the dimension of each of the gamma camera heads in a plane perpendicular to the line is at least as large as the diameter of the circle.

21. A gamma camera system according to claim 1 wherein the gamma camera is operative to reconstruct images within a reconstruction circle and wherein the dimension of each of the gamma camera heads in a plane perpendicular to the line is at least as large as the radius of the circle, but smaller than the diameter of the circle.

22. A gamma camera system according to claim 21 wherein the dimension is less than 1.5 times the radius.

23. A gamma camera head according to claim 1 wherein the heads are rigidly connected at the angle.

24. A gamma camera system comprising:
   a pair of gamma camera heads connected to form substantially a right angle; and
   an arm on which the pair of cameras heads are mounted, wherein the arm is adapted to allow for linear motion of the pair of camera heads in a plane containing the right angle and is not adapted for orbital motion of the arm itself about patient in a field of view of the camera heads.

25. A gamma camera according to claim 24 wherein the arm is adapted to move in the plane without moving a base on which the camera system is mounted.

26. A gamma camera system according to claim 24 wherein the arm is adapted to allow for linear motion in all directions within the plane of the right angle.

27. A gamma camera system according to claim 24 and including a controller operative to reconstruct images within a reconstruction circle and wherein the amount of the linear motion is at least as large as a diameter of the circle.

28. A gamma camera head according to claim 24 wherein the heads are rigidly connected at the angle.

* * * * *